(12) United States Patent
Astala

(10) Patent No.: US 6,804,100 B2
(45) Date of Patent: Oct. 12, 2004

(54) METHOD AND APPARATUS FOR PROTECTION OF BATTERIES

(75) Inventor: Jari Astala, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 195 days.

(21) Appl. No.: 09/752,003

(22) Filed: Dec. 29, 2000

(65) Prior Publication Data

US 2001/0021092 A1 Sep. 13, 2001

(30) Foreign Application Priority Data

Dec. 31, 1999 (FI) ................................................ 992845

(51) Int. Cl.[7] .............................................. H02H 5/04
(52) U.S. Cl. ...................... 361/93.2; 361/93.8; 361/18; 361/90; 320/134
(58) Field of Search ........................... 361/18, 90, 93.8, 361/93.9, 93.2, 103, 100; 320/136, 134, DIG. 13; 327/538, 543, 309, 310

(56) References Cited

U.S. PATENT DOCUMENTS

| | | | |
|---|---|---|---|
| 5,432,371 A | 7/1995 | Denner et al. | 257/409 |
| 5,783,998 A | * 7/1998 | Nakajou et al. | 340/636 |
| 5,796,290 A | 8/1998 | Takahashi | 327/512 |
| 6,014,030 A | * 1/2000 | Smith et al. | 324/705 |
| 6,137,265 A | * 10/2000 | Cummings et al. | 320/133 |

FOREIGN PATENT DOCUMENTS

EP 0863597 A1 9/1998

OTHER PUBLICATIONS

"Power MOSFET Driver with Lossless Protection", National Semiconductor, pp. 1–14, 1995.
"Features Versus IPS Reference Table (Low Side Switch)", International Rectifier I.P.S. Selection Guide, 3 pages, 1998.
"Fully Protected High Side Power MOSFET Switch", International Rectifier IPS511/IPS511S, pp. 1–12.
International Rectifier IRLBD59N04E Data Sheet, pp. 1–8, 2000.
Japanese Patent Publication No. 10–223260, and English translation thereof.

* cited by examiner

Primary Examiner—Kim Huynh
(74) Attorney, Agent, or Firm—Perman & Green, LLP

(57) ABSTRACT

The invention relates to a protection circuit (30) which includes at least one switch (FET1, FET2) including at least one control means (G1, G2) for adjusting the conductivity of the at least one switch (FET1, FET2). The conductivity is arranged to be adjustable by means of an electrical control conducted to the control means (G1, G2). The protection circuit (30) includes means (22, 25, 26) for forming the electrical control, means (27, 28) for measuring at least one physical quantity affecting at least one switch (FET1, FET2), means (10) for providing information about the dependence of the conductivity properties of the at least one switch (FET1, FET2) on the at least one physical quantity, means (29) for determining the conductivity of the at least one switch (FET1, FET2) on the basis of the at least one physical quantity and the conductivity properties of the at least one switch (FET1, FET2) and means (29, 27) for determining the current ($I_{TOT}$) conducted through the at least one switch (FET1, FET2) at least partly on the basis of the conductivity. Thus, the electrical control is arranged to be formed at least partly on the basis of the determined current.

55 Claims, 5 Drawing Sheets

METHOD AND APPARATUS FOR PROTECTION OF BATTERIES

FIELD OF THE INVENTION

The present invention relates to a protection circuit, integrated circuit and host device for the protection of batteries.

BRIEF DESCRIPTION OF RELATED DEVELOPMENTS

At present, it is very important for the users of different electronic devices that the electronic device can be used as long as possible before it is necessary to charge the battery. Furthermore, especially in portable devices, the size of the battery is significant, and thus it is not necessarily reasonable to reduce the need to charge the battery by increasing the capacity of the battery. Therefore, especially in wireless communication devices and in portable computers, the use of Lithium-based batteries, such as Li-ion (Lithium ion), Li-poly (Lithium polymer) or Li-metal (Lithium metal) batteries has become increasingly common.

A Li-ion battery is considerably lighter and has a somewhat larger capacity than NiCd and NiMH batteries, and thus considerably longer operating times are attained without increasing the size of the battery. On the other hand, the manufacture of a Li-ion battery is far more expensive than the manufacture of NiCD and NiMH batteries. Recharging of a Li-ion battery does not require that the battery is (fully) discharged. On the other hand, the longest possible service life is obtained from NiCD batteries if the battery is discharged completely before recharging. In Li-ion batteries self-discharging is less than e.g. in NiCD batteries (approximately 1 to 2% per month), and thus an unused Li-ion battery may retain its charge for a comparatively long time. In subzero temperatures, the operation of a Li-ion battery is similar to that of NiMH batteries, in other words it is not particularly good.

An advantage of the Li-poly battery is that it is easier to manufacture and it is possible to make the battery smaller and lighter than the Li-ion battery. A Li-poly battery can be shaped quite freely. The self-discharge rate of a Li-poly battery is even smaller than that of a Li-ion battery.

Li-ion and Li-poly batteries should be protected from over-voltage and under-voltage by means of a rather complex protection circuit, because otherwise the cells of the battery can be damaged so that they become unusable. The most important rule when charging Li-ion and Li-poly batteries is to keep the charging voltage as constant as possible during the entire charging process. Normally, the charging voltage is either approximately 4.1 V or approximately 4.2 V. The purpose of the protection circuit is to interrupt the charging process when a particular voltage is attained, for example 0.15 V over the charging voltage. After the operation of the over-voltage protection circuit, the battery can nevertheless be discharged. When the battery has been discharged, it can be charged again. In addition to too high a voltage (over-voltage), Li-ion and Li-poly batteries are particularly sensitive to too low a voltage (under-voltage) and to over-current when they are charged or discharged. In these cases, the purpose of the protection circuit is to interrupt the discharging or charging of the battery.

In order to implement the functionality of the protection circuit, the protection circuit should advantageously contain at least a control block and two switch means such as two field-effect transistors (FET), connected in series. One field-effect transistor protects the battery from over-voltage and the other from under-voltage. By means of this arrangement of two field-effect transistors it is possible to enable the battery to be discharged after an over-voltage condition and to be charged after an under-voltage condition.

Because of parasitic diodes internal to the field-effect transistor, current can be passed in the opposite direction through the field-effect transistor from the drain to the source when the field-effect transistor is in a high impedance state. This enables a battery protected by the protection circuit to be discharged after an over-voltage condition and to be recharged after an under-voltage condition.

In a particular prior art solution, a low impedance resistance is connected in series in the voltage supply line of the battery. The voltage across this resistance is measured, wherein an over-current condition can be detected when the voltage exceeds a predetermined limit. The use of components that increase the impedance is not desirable, because they reduce the voltage supplied to the electronic device and unnecessarily increase power consumption. Thus, the operating time of the device using the battery is shortened.

In another prior art solution, an over-current condition is detected in such a way that the voltage across the drain and source of the field-effect transistor is measured. Additionally, the value of the resistance between the drain and source, the so-called conducting state drain-to-source resistance $R_{ds(on)}$, is estimated. In prior art solutions, this drain-to-source resistance is presumed constant. Thus, an estimate of the current is obtained by dividing the voltage across the drain and the source of the field-effect transistor by the drain-to-source resistance. One disadvantage of this solution is that the drain-to-source resistance is not constant, but changes as the gate voltage of the field-effect transistor changes. Moreover, the drain-to-source resistance depends to a considerable degree on the temperature of the field-effect transistor.

In prior art solutions over-current conditions that occur during charging are not monitored, but the battery is protected only e.g. by a fuse. Charging currents are usually smaller and easier to predict than currents that occur when the battery is being discharged, and consequently, over-current during charging has not been considered a problem. However, it is not impossible that an over-current condition can also arise during charging, for example due to a defective charging device. Thus, it is also advantageous to protect the battery from over-current during charging.

Patent application JP 10223260 discloses a protection circuit for a battery, in which the aim is to compensate the effect of temperature when measuring the current, so that more reliable measurement results are obtained. The protection circuit of the invention according to JP 10223260 comprises an over-voltage and under-voltage detection unit 2 (FIG. 1), a charging control block 3, an over-current protection block 4, a discharging-side overheating protection block 5, a charging-side overheating protection block 6 and two field-effect transistors FET1, FET2.

The purpose of the over- and under-voltage detection unit 2 is to detect when the voltage of the cells 1a, 1b, 1b of the battery is too high or too low. When a load (not shown), for example an electronic device, is connected across connectors P1, P2, in other words the battery is discharged, the over-voltage or under-voltage detection unit 2 monitors each cell 1a, 1b, 1c of the battery separately to detect an under-voltage state. If the voltage of any cell is lower than a certain first threshold value, the over-voltage and under-voltage detection unit sets line P into a first logical state, which results in the first field-effect transistor FET1 becoming non-conductive, whereupon discharging of the battery is terminated.

When a charging device (not shown) is connected across connectors P1, P2, i.e. the battery is charged, the over- and under-voltage detection unit 2 monitors each cell 1a, 1b, 1c of the battery separately to detect an over-voltage state. If the voltage of any cell exceeds a certain second threshold value, the over-voltage and under-voltage detection unit sets line L into a second logical state, which results in the second field-effect transistor FET2 becoming non-conductive, whereupon charging of the battery is terminated.

The purpose of the charging control block 3 is to control the second field-effect transistor FET 2 in such a way that when line L is in the second logical state, the second field-effect transistor FET2 does not pass a charging current, i.e. the battery is not charged. Correspondingly, when line L is in the first logical state, the second field-effect transistor passes a charging current, i.e. the battery is charged.

The purpose of the over-current protection block 4 is to interrupt discharging of the battery when the current supplied to the electronic device is too high. The over-current protection block comprises two symmetrical circuits with substantially equal properties. The circuits are connected to the drain and source of the first field-effect transistor. As the current increases, the voltage difference between the drain and the source of the first field-effect transistor also increases. When this voltage difference reaches a certain value, it causes the over-current protection block to set the first field-effect transistor into a non-conductive state. Thus the current supply to the electronic device is interrupted.

Let us assume that a load (not shown), for example an electronic device, is connected between connectors P1, P2, i.e. the battery is discharged, and the cells 1a, 1b, 1c of the battery are not in an under-voltage condition. In this situation, an over-current causes the temperature of the first field-effect transistor FET1 to rise above normal. When the first field-effect transistor reaches a certain temperature, the discharging-side overheating protection block 5 switches the first field-effect transistor FET1 into a non-conductive state, whereupon discharging of the battery is terminated.

Correspondingly, let us assume that a charging device is connected between connectors P1. P2, i.e. the battery is charged, and the cells 1a, 1b, 1c of the battery are not in an over-voltage condition. In this situation, an over-current causes the temperature of the second field-effect transistor to rise above normal. When the second field-effect transistor reaches a certain temperature, the charging-side overheating protection block 6 switches the second field-effect transistor FET2 into a non-conductive state, whereupon charging of the battery is terminated.

However, this solution has the disadvantage that it does not take into account changes in the drain-to-source resistance of the field-effect transistor as the temperature changes. As mentioned earlier in this description, a change in temperature changes the drain-to-source resistance between the source and the drain. Thus, the shut-off actually takes place at different current values at different temperatures.

It is an objective of the present invention to provide a protection circuit for batteries, such as Li-ion and Li-poly batteries, which is capable of more accurately protecting a battery from over-current, over-voltage and under-voltage when the battery is charged or discharged by taking into account the dependence of the properties of a field-effect transistor on at least one physical quantity, such as temperature and/or gate voltage. Because in the solution according to the invention, the value of the current can be determined more accurately compared with present solutions, the battery's charge can also be measured considerably more accurately when compared with present solutions. Another objective of the invention is to avoid the introduction of additional impedance into the protection circuit.

SUMMARY OF THE INVENTION

According to the invention, the first objective can be attained by using a value of drain-to-source resistance, compensated using at least one physical quantity, such as temperature and/or gate voltage, to detect over-current. The compensation takes place in such a way that information concerning the behaviour of the field-effect transistors at different temperatures and/or different gate voltages, as well as measured temperature and/or voltage values is stored in a parameter memory of the protection circuit. This information is used to obtain a value of drain-to-source resistance which is as accurate as possible, whereupon the actual value of the current can be determined more accurately than in prior art methods. Furthermore, monitoring can take place in connection with both charging and discharging of the battery. Because the temperature and/or the gate voltage of the field-effect transistor is taken into account when the current is determined, a more precise value is also obtained for the charge of the battery compared with prior art solutions. Because the current is measured in a more precise manner when compared to prior art, it is also possible to increase the operating time of the host device. According to the invention, the second objective can be attained in such a way that an over-current is detected using the drain-to-source resistances and/or drain-to-source voltage of the field-effect transistors, whereupon additional resistors are not necessary. The protection circuit according to the invention can be advantageously implemented in an application specific integrated circuit (ASIC), wherein the battery protection circuit becomes considerably smaller and less expensive when compared to circuits where separate components are used.

In one aspect, the present invention is directed to a protection circuit. In one embodiment the protection circuit comprises at least one switch (FET1, FET2) comprising at least one control means (G1, G2) for adjusting the conductivity of at least one switch (FET1, FET2), the conductivity being arranged to be adjustable by means of an electrical control applied to the control means (G1, G2). The protection circuit (30) include. means (22, 25, 26) for forming the electrical control, means (27, 28) for measuring at least one physical quantity affecting the at least one switch (FET1, FET2), means (10) for providing information about the dependence of the conductivity properties of said at least one switch (FET1, FET2) on the at least one physical quantity, means (29) for determining the conductivity of the at least one switch (FET1, FET2) on the basis of the at least one physical quantity and the conductivity properties of the at least one switch (FET1, FET2) and means (29, 27) for determining the current ($I_{TOT}$) passing through the at least one switch (FET1, FET2) at least partly on the basis of the conductivity, wherein the electrical control is arranged to be formed at least partly on the basis of the determined current.

In another aspect, the present invention also relates to an integrated circuit. In one embodiment the integrated circuit comprises a protection circuit which comprises at least one switch (FET1, FET2) comprising at least one control means (G1, G2) for adjusting the conductivity of the at least one switch (FET, FET2), the conductivity being arranged to be adjustable by means of an electrical control conducted to the control means (G1, G2). The protection circuit (30) includes means (22, 25, 26) for forming the electrical control, means (27, 28) for measuring at least one physical quantity affecting the at least one switch (FET1, FET2), means (10) for providing information about the dependence of the conductivity properties of the at least one switch (FET1, FET2) on the at least one physical quantity, means (29) for determining the conductivity of the at least one switch (FET1, FET2) on the basis of the at least one physical quantity and the conductivity properties of the at least one switch (FET1, FET2) and means (29, 27) for determining the current ($I_{TOT}$) pausing through the at least one switch (FET1, FET2) at least partly on the basis of the conductivity, wherein the electrical control is arranged to be formed at least partly on the basis of the determined current.

In another aspect, the present invention also relates to an integrated circuit. In one embodiment the integrated circuit comprises a protection circuit which comprises at least one switch (FET1, FET2) comprising at least one control means (G1, G2) for adjusting the conductivity of the at least one switch (FET1, FET2), the conductivity being arranged to be adjustable by means of an electrical control conducted to the control means (G1, G2). The protection circuit (30) includes means (22, 25, 26) for forming the electrical control, means (27, 28) for measuring at least one physical quantity affecting the at least one switch (FET1, FET2), means (10) for providing informatio about the dependence of the conductivity properties of the at least one switch (FET1, FET2) on the at least one physical quantity1, means (29) for determining the conductivity of the at least one switch (FET1, FET2) on the basis of the at least one physical quantity and the conductivity properties of the at least one switch (FET1, FET2) and means (29, 27) for determining the current ($I_{TOT}$) passing through the at least one switch (FET1, FET2) at least partly on the basis of the conductivity, wherein the electrical control is arranged to be formed at least partly on the basis of the determined current.

In a further aspect, the invention relates to a host device. In one embodiment the host device 33, is provided with a protection circuit 30 which comprises at least one switch (FET1, FET2) comprising at least one control means (G1, G2) for adjusting the conductivity of the at least one switch (FET1, FET2), the conductivity being arranged to be adjustable by means of an electrical control conducted to the control means (G1, G2). The protection circuit (30) includes means (22, 25, 26) for forming the electrical control, means (27, 28) for measuring at least one physical quantity affecting the at least one switch (FET1, FET2), means (10) for providing information about the dependency of the conductivity properties of the at least one switch (FET1, FET2) on the at least one physical quantity, means (29) for determining the conductivity of the at least one switch (FET1, FET2) on the basis of the at least one physical quantity and the conductivity properties of the at least one switch (FET1, FET2) and means (29, 27) for determining the current ($I_{TOT}$) passing through the at least one switch (FET1, FET2) at least partly on the basis of the conductivity, wherein the electrical control is arranged to be formed at least partly on the basis of the determined current.

In another aspect, the present invention relates to a battery. In one embodiment the battery 31 includes a protection circuit 30 which comprises at least one switch (FET1, FET2) comprising at least one control means (G1, G2) for adjusting the conductivity of the at least one switch (FET1, FET2), the conductivity being arranged to be adjustable by means of an electrical control conducted to the control means (G1, G2). The protection circuit (30) includes mean, (22, 25, 26) for forming the electrical control, means (27, 28) for measuring at least one physical quantity affecting the at least one switch (FET1, FET2), means (10) for providing information about the dependence of the conductivity properties of said at least one switch (FETX, FET2) on the at least one physical quantity1 means (29) for determining the conductivity of the at least one switch (FET1, FET2) on the basis of the at least one physical quantity and the conductivity properties of the at least one switch (FET1, FET2) and means (29, 27) for determining the current ($I_{TOT}$) passing through the at least one switch (FET1, FET2) at least partly on the basis of the conductivity, wherein the electrical control is arranged to be formed at least partly on the basis of the determined current.

In a further aspect, the invention relates to a method for protecting a battery. In one embodiment the method for protecting a battery using a protection circuit comprises providing the protection circuit with at least. one switch (FET1, FET2) which comprises at least one control means (G1, G2) for adjusting the conductivity of the at least one switch (FET1, FET2), by means of an electrical control conducted to the control means (G1, G2). In the method at least one physical quantity affecting the at least one switch (FET1, FET2) is measured, information about the dependence of the conductivity properties of said at least one switch on the at least one physical quantity in provided, the conductivity of the at least one switch (FET1, FET2) is determined on the basis of the at least one physical quantity and the conductivity properties of the at least one switch (FET1, FET2) and the current ($I_{TOT}$) conducted through the at least one switch (FET1, FET2) is determined at least partly on the basis of the conductivity, wherein the electrical control is formed at least partly on the basis of the determined current.

By means of the present invention, considerable advantages are achieved compared with solutions according to prior art. Because the protection circuit according to the invention protects a battery from over-current considerably better than prior art solutions, the operating life of the battery is extended because, as a result of more accurate over-current protection, the probability of damage to the battery is reduced. By means of the solution according to the invention, it is possible to protect a battery from over-current both when discharging and charging the battery, and thus the battery is also protected, for example, from a faulty charging device. Because over-current protection is implemented in such a way that the protection circuit does not contain unnecessary resistive components which cause power dissipation, the operating time of the device using the battery is increased. Furthermore, the protection circuit according to the invention is less expensive and smaller compared with prior art protection circuits, because it can be implemented in a single application specific integrated circuit. Because the charge of the battery can be measured considerably more accurately using the protection circuit according to the invention than in prior art solutions, it is possible to estimate e.g. the shutdown time of the device that is being used.

BRIEF DESCRIPTION OF THE DRAWINGS

In the following, the invention will be described in more detail with reference to the accompanying drawings which present a battery protection circuit according to a preferred embodiment of the invention. In the drawings

DETAILED DESCRIPTION OF THE PREFERRED EMBODIMENT(S)

An object of the method for protection of a battery according to the invention is to determine the actual charging and discharging current as accurately as possible. To achieve this, the first step is to determine the value of at least one physical quantity, preferably temperature and/or gate voltage related to at least one field-effect transistor used as a switch, after which a compensation is performed in which at least one said quantity is taken into account when determining the drain-to-source resistance.

Figure 3:
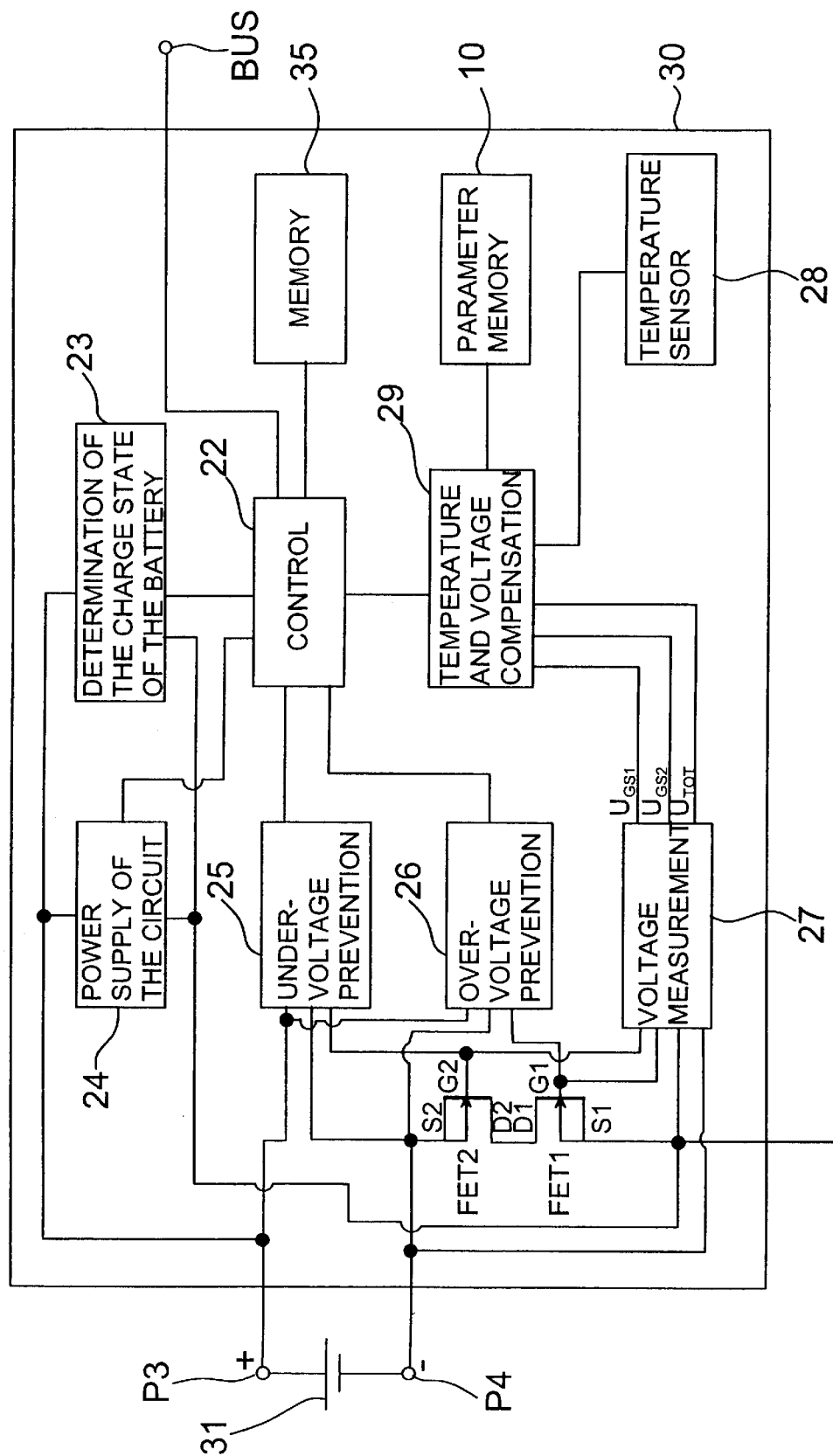
FIG. 3 shows a protection circuit according to a preferred embodiment of the invention, implemented in an integrated circuit, the functional blocks of the protection circuit and a battery coupled to the protection circuit.

FIG. 3 shows a protection circuit 30 according to a preferred embodiment of the invention, implemented in an integrated circuit, as well as its various functional blocks. The purpose of field-effect transistors FET1 and FET2 is to protect the battery from over- or under-voltage in a manner substantially similar to prior art solutions, but considerably more accurately. The protection circuit employs two field-effect transistors, because there should also be a possibility to discharge the battery 31 in a situation where the first field-effect transistor FET1 prevents charging of the battery 31 in an over-voltage state. Similarly, there should be a possibility to charge the battery when the second field-effect transistor FET2 prevents discharge of the battery in an under-voltage state.

The field-effect transistors are connected in series in such a way that the drain D1 of the first field-effect transistor is connected to the drain D2 of the second field-effect transistor. The source S1 of the first field-effect transistor FET1 is advantageously connected to the ground potential GND, and the source S2 of the second field-effect transistor FET2, in turn, is connected to the negative pole P4 of the battery 31. The gate G1 of the first field-effect transistor is connected to a voltage measuring block 27 and to an over-voltage prevention block 26. Correspondingly, the gate G2 of the second field-effect transistor is connected to voltage measuring block 27 and to an under-voltage prevention block 25.

Figure 5:
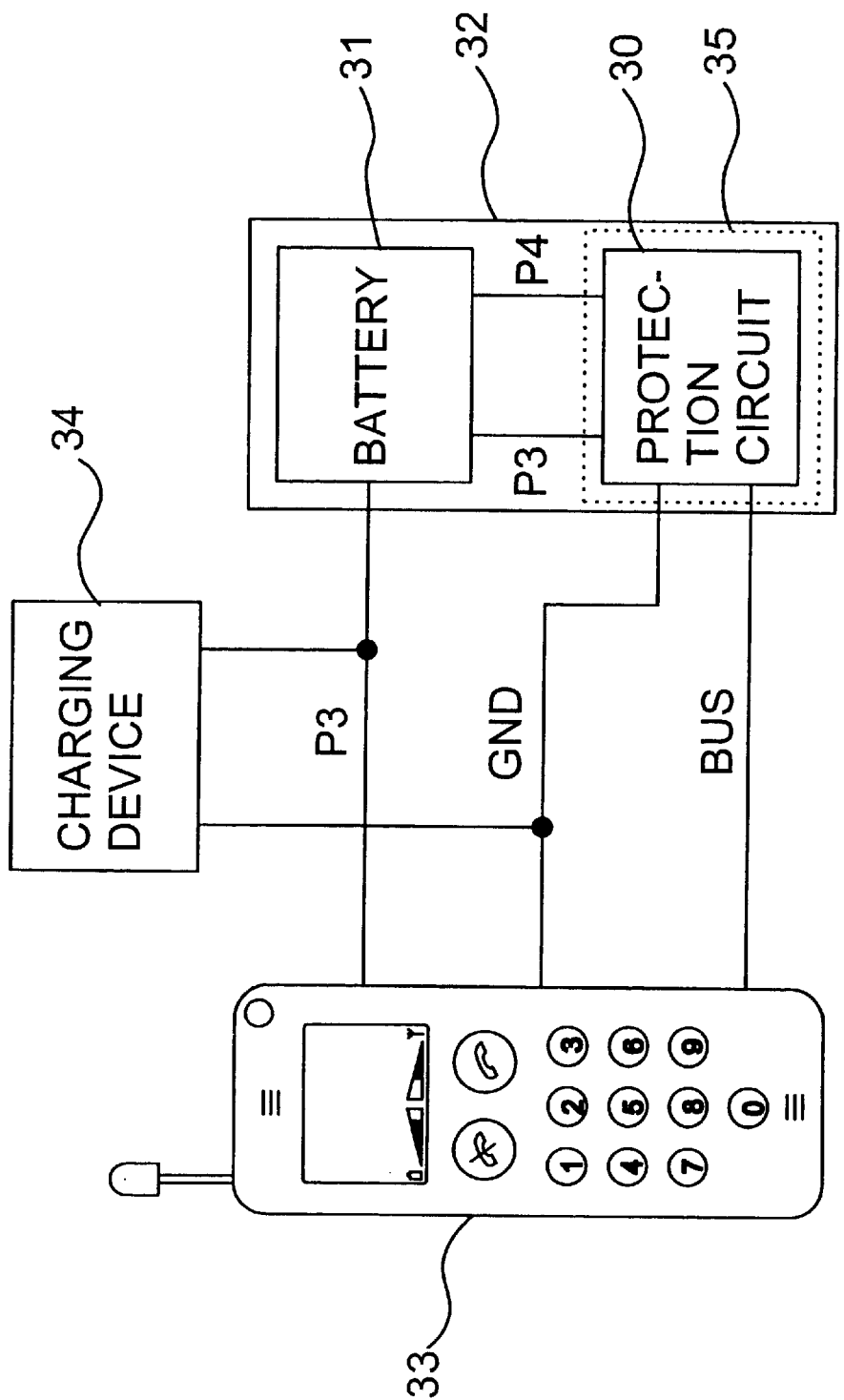
FIG. 5 shows a battery pack according to a preferred embodiment of the invention, the functional blocks of the battery pack as well as a wireless communication device to which the battery pack is connected.

When a load, for example an electronic device 33 (FIG. 5) is connected between connectors P3 and GND, i.e. the battery 31 is discharged, the under-voltage prevention block 25 monitors the state of the battery. If the voltage of the battery falls below a particular predetermined threshold value, the under-voltage prevention block 25 transmits information about this situation to control block 22. As a result, the control block transmits information about the under-voltage state via an interface bus BUS to the electronic device 33 (FIG. 5). The control block 22 also transmits a signal concerning the under-voltage state to the under-voltage prevention block 25. When the under-voltage prevention block 25 receives this signal, it connects a voltage (advantageously approximately 0 V in the case of an N-type field-effect transistor) to the gate of the second field-effect transistor FET2, by means of which the drain-to-source resistance of the second field-effect transistor FET2 is put into a high impedance state. This also results in the current supply to the electronic device 33 being interrupted, but current can still flow through the second field-effect transistor FET 2 in the opposite direction (through a parasitic diode), i.e. it is still possible to charge the battery.

Correspondingly, when a charging device 34 (FIG. 5) is connected between connectors P3 and GND, i.e. the battery is charged, the over-voltage prevention block 26 monitors the state of the battery 31. If the voltage of the battery exceeds a particular predetermined threshold value, the over-voltage prevention block 26 transmits information about this situation to control block 22. As a result of this, control block 22 transmits information on the over-voltage state via the interface bus BUS to the host device 33 (FIG. 5). The control block 22 also transmits a signal concerning the over-voltage state to the over-voltage prevention block 26. In this case, the over-voltage prevention block 26 connects a voltage to the gate of the first field-effect transistor FET1, by means of which the drain-to-source resistance of the first field-effect transistor FET1 is put into a high impedance state. This results in the supply of charging current to the battery 31 being interrupted, but current can still be conducted through the first field-effect transistor FET1 in the opposite direction (through a parasitic diode), i.e. it is still possible to discharge the battery.

FIG. 3 shows an example in which the battery 31 comprises only one cell. Naturally, it is possible that the battery 31 may have several cells, in which case the under-voltage prevention block 25 and the over-voltage prevention block 26 advantageously monitor the voltage of each cell separately. If the voltage of any cell is lower than a particular predetermined under-voltage threshold value, or if it exceeds a particular predetermined over-voltage threshold value, actions similar to those presented above are performed.

The power supply block 24 of the circuit is connected to the positive voltage P3 of the battery 31 and to the ground potential GND of the protection circuit 30. When the battery voltage is within permissible limits or in an over-voltage state, the circuit's power supply block supplies the protection circuit with the current it requires via the control block 22, i.e. the protection circuit acts as part of the load. When the battery voltage falls below the threshold value, i.e. the battery is in an under-voltage state, the under-voltage prevention block 25 puts the second field-effect transistor FET2 into a non-conductive state. Thus, the power supply from the battery to the protection circuit, as well as the load, is interrupted, whereupon the protection circuit does not consume the charge of the battery. If the power supply to the protection circuit were not interrupted in the under-voltage state, the power consumed by the protection circuit could cause the battery voltage to fall too low, whereupon the battery could be damaged and become unusable. When charging of the battery is initiated after an under-voltage condition, the protection circuit again receives the necessary operating current to protect the battery.

In the under-voltage state presented above, the control block 22 transmits a signal relating to the under-voltage to the under-voltage prevention block 25, which interrupts power supply to the host device 33. However, before this under-voltage state occurs, the control block 22 advantageously transmits information on the forthcoming under-voltage state to the host device 33, preferably at a stage when the voltage of the battery 31 falls below a certain threshold value. This threshold value is advantageously somewhat greater than the under-voltage threshold value. This arrangement enables the electronic device 33 to formulate a notification to the user indicating that the battery 31 has become empty before the power supply to the electronic device is interrupted. The notification is given, for example, using a sound signal, and/or a message presented on the display device, in a manner known as such.

In compensation block 29, the aim is to obtain the most accurate possible estimate of the actual current passing through the field-effect transistors FET 1, FET2, irrespective of their temperatures and gate voltages. The estimate of the actual magnitude of the current provided by compensation block 29 is used to protect the battery from over-current during discharging and charging, and to determine the charge of the battery more accurately. In order for the compensation block 29 to calculate a compensated value for the current, it requires information relating to the gate voltages of the field-effect transistors FET1, FET2 and on the voltage across the field-effect transistors from a voltage measurement block 27, information on the temperature of the integrated circuit from a temperature sensor 28, as well as information on the properties of the field-effect transistors from a parameter memory 10.

The voltage measurement block 27 measures the gate voltage $U_{GS1}$, $U_{GS2}$ of both field-effect transistors FET1, FET2 and the voltage across the field effect transistors, $U_{TOT}$. Advantageously, the measurement is performed by means of one or more AD converters. Preferably, the measurement is effected by means of three separate AD converters, wherein the voltages do not have to be measured consecutively. The voltage values obtained are transmitted to the compensation block 29.

The field-effect transistors FET1, FET2 and the temperature sensor 28 are preferably located in the same integrated circuit, because in that case the protection circuit 30 does not have to comprise a separate temperature sensor for both field-effect transistors. Furthermore, the temperature sensor 28 is preferably located inside the integrated circuit with the field-effect transistors FET1, FET2, because the temperature on the surface of the integrated circuit can be substantially different from that inside the circuit, and the temperature changes considerably more slowly on the surface of the circuit than inside the circuit.

Figure 4B:
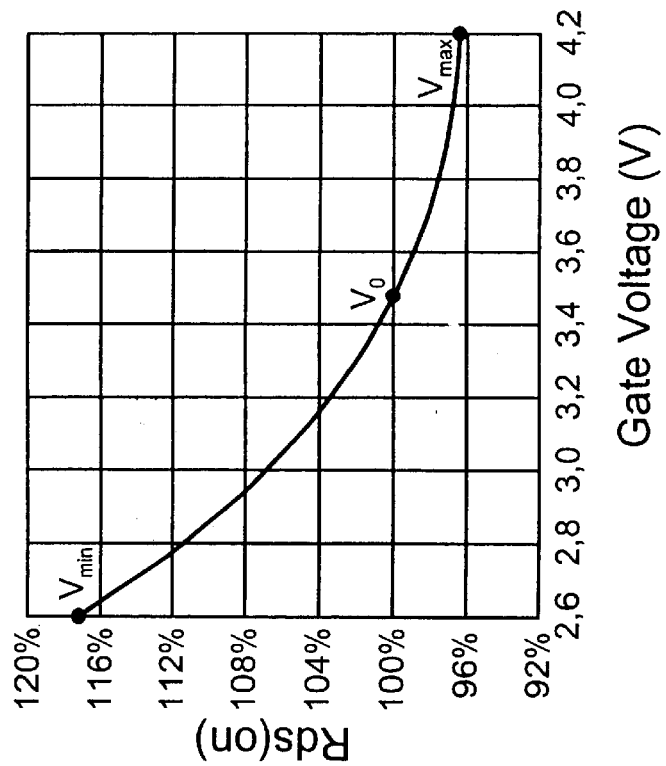
FIG. 4b shows an example of the gate voltage dependence of the drain-to-source resistance.
Figure 4A:
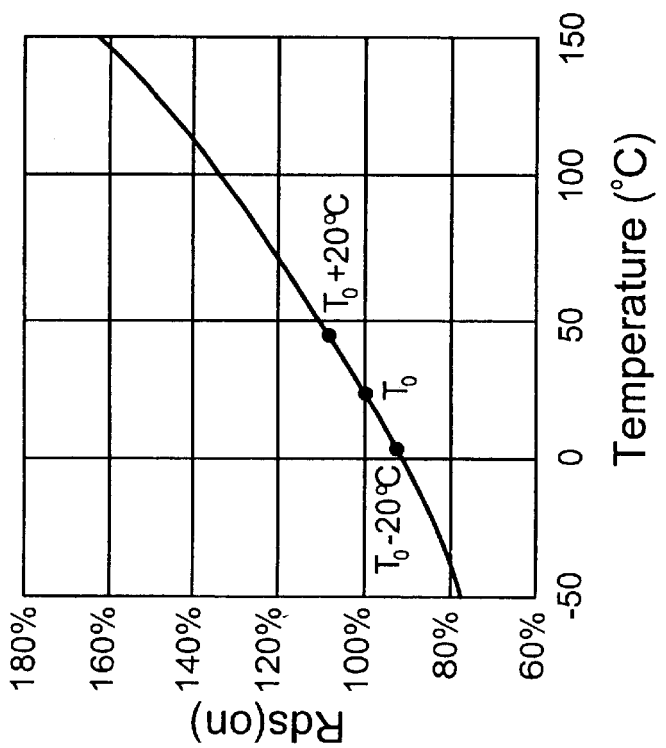
FIG. 4a shows an example of the temperature dependence of the drain-to-source resistance.

Preferably, the behaviour of the drain-to-source resistance $R_{ds(on)}$, measured across the field-effect transistor at different temperatures (e.g. FIG. 4a) and at different gate voltages (e.g. FIG. 4b) with respect to reference values $T_0$ and $V_0$ over a sufficiently large range, is stored in the parameter memory 10 of the protection circuit. Advantageously, the parameter memory takes the form of an EEPROM (Electrically Erasable Programmable Read Only Memory) and the aforementioned behaviour information is stored during the manufacture of the protection circuit. In the example situations shown in FIGS. 4a and 4b, the reference temperature $T_0$ is 23° C. and the reference voltage $V_0$ is 3.5 V. Furthermore, the value of the drain-to-source resistance $R_{ds(on)}$ at temperature $T_0$ and gate voltage $V_0$ is stored in the parameter memory. If the behaviour of the drain-to-source resistance $R_{ds(on)}$ at different temperatures can be assumed to be approximately linear over the particular range of interest (as is the case in FIG. 4a), it is only necessary to store information about the behaviour (e.g. the value $R_{ds(on)}$) at two different temperatures which are sufficiently far apart (e.g. $T_0$ +/−20° C.). Using these points, the value of the drain-to-source resistance $R_{ds(on)}$ at other temperatures can be obtained e.g. by means of interpolation, which is known as such. As is shown in FIG. 4b, the behaviour of the drain-to-source resistance $R_{ds(on)}$ at different gate voltages is not exactly linear, and thus it is preferable to store the behaviour (e.g the value of $R_{ds(on)}$) for at least three points (e.g, $V_0$, $V_{MIN}$ and $V_{MAX}$) in the parameter memory 10, by means of which the behaviour/value of the drain-to-source resistance $R_{ds(on)}$ at other gate voltages can be calculated. This can be done, for example, using a mathematical function that passes through or approximates the points $V_0$, $V_{min}$ and $V_{max}$ and models the behaviour of the drain-to-source resistance $R_{ds(on)}$ with respect to variations in gate voltage.

Preferably, a value for the drain-to-source resistance $R_{ds(on)}$ at a particular temperature T and gate voltage V is determined by means of correction coefficients, which are used to modify (correct) the value of the drain-to-source resistance $R_{ds(on)}$ defined at the reference temperature $T_0$ and the reference gate voltage $V_0$. Referring to the value of the drain-to-source resistance $R_{ds(on)}$ defined in the reference conditions as $R_{ds(on)0}$, a value for the drain-to-source resistance $R_{ds(on)}$ at temperature $T_1$, different from temperature $T_0$, is advantageously determined by deriving a temperature correction coefficient from the temperature-related behaviour information stored in the parameter memory 10 and multiplying the drain-to-source resistance $R_{ds(on)}$ by the temperature correction coefficient so defined. In a similar manner, a value for the drain-to-source resistance $R_{ds(on)}$ at a gate voltage $V_1$, different from $V_0$, can be obtained by deriving a gate voltage correction coefficient from the gate-voltage related behaviour information stored in the parameter memory and multiplying the drain-to-source resistance $R_{ds(on)}$ by the gate voltage correction coefficient thus obtained. Advantageously, a value for the drain-to-source resistance $R_{ds(on)}$ at a temperature $T_1$ and a gate voltage $V_1$ is obtained by deriving both a temperature correction coefficient and a gate voltage correction coefficient and performing appropriate multiplications of the drain-to-source resistance $R_{ds(on)}$. Examples of how this may be done are presented later in the text. Preferably the correction coefficients take the form of numerical factors representing a ratio between the value of the drain-to-source resistance $R_{ds(on)}$ at a given temperature (or gate voltage) divided by the value of the drain-to-source resistance $R_{ds(on)}$ in the reference conditions ($R_{ds(on)0}$). For example, a temperature correction coefficient intended to compensate for a change in the drain-to-source resistance $R_{ds(on)}$ occurring between the reference temperature $T_0$ and a temperature $T_1$ could be determined from the following relationship: $K_{1(T1)} = R_{ds(on)T1}/R_{ds(on)0}$. In other words, the temperature correction coefficient effectively represents a ratio between the value of the drain-to-source resistance $R_{ds(on)}$ at temperature $T_1$ and the value of the drain-to-source resistance $R_{ds(on)}$ at the reference temperature $T_0$. The gate voltage correction coefficient can be viewed in an analogous manner. It should be noted that if the temperature correction coefficient is dependent on the gate voltage and/or the gate voltage correction coefficient is dependent on the temperature, it is necessary to use several correction tables for the gate voltage and/or temperature.

It is obvious that in addition to temperature and voltage, mentioned in this description, the invention can also be applied for the compensation of other physical quantities which affect the properties, especially the conductivity, of the switches FET1, FET2. One such quantity is aging, wherein by means of the method according to the invention it is possible to take into account the operating age of the protection circuit and/or the battery.

Naturally, it is possible to store complete reference tables indicating the behaviour of the drain-to-source resistance $R_{ds(on)}$ at different temperatures and at different gate voltages. Thus, temperature correction coefficients for the drain-to-source resistance $R_{ds(on)}$, or actual values, corrected (multiplied) using the correction coefficients, are stored in the first table over an appropriate temperature range (e.g. −50° C. to +150° C.) advantageously at intervals corresponding to the resolution with which the temperature can be measured. Correspondingly, gate voltage correction coefficients for the drain-to-source resistance $R_{ds(on)}$, or actual values, are stored in a second table over an appropriate voltage range (e.g. 2.5 V to 5.0 V) advantageously at intervals corresponding to the resolution with which the gate voltage can be measured. Furthermore, it is possible that these tables are combined to form a single, two-dimensional table from which it is possible to find a correction coefficient or an actual value for each temperature-gate voltage combination.

If actual values are stored in the parameter memory instead of correction coefficients, the operation of the protection circuit can be accelerated to some extent, because it is necessary to perform a smaller number of calculations than in a situation where correction coefficients are used. Preferably, the properties of the field-effect transistors FET1 and FET2 are substantially alike, wherein it is only necessary to store information about one field-effect transistor in parameter memory 10. Thus, it is possible to use the same information contained in the parameter memory 10 for both field-effect transistors. If the field-effect transistors have different properties, the properties of both field-effect transistors are stored separately in the parameter memory. To ensure that the temperature and voltage values stored in the parameter memory 10 are sufficiently accurate, the information is calibrated, advantageously in connection with the manufacture of the protection circuit 30.

Figure 1:
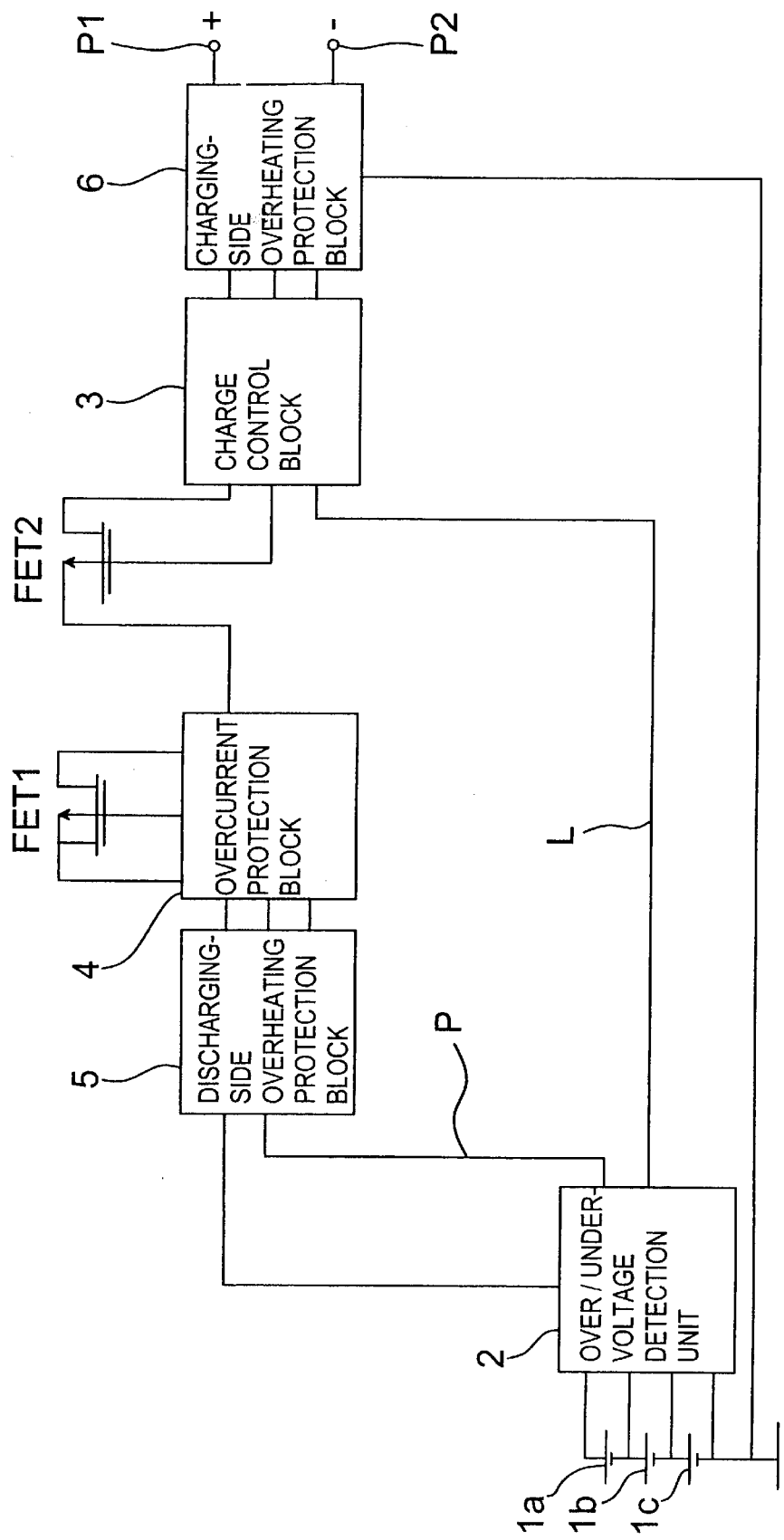
FIG. 1 shows a block diagram of a prior art protection circuit in a simplified manner.
Figure 2:
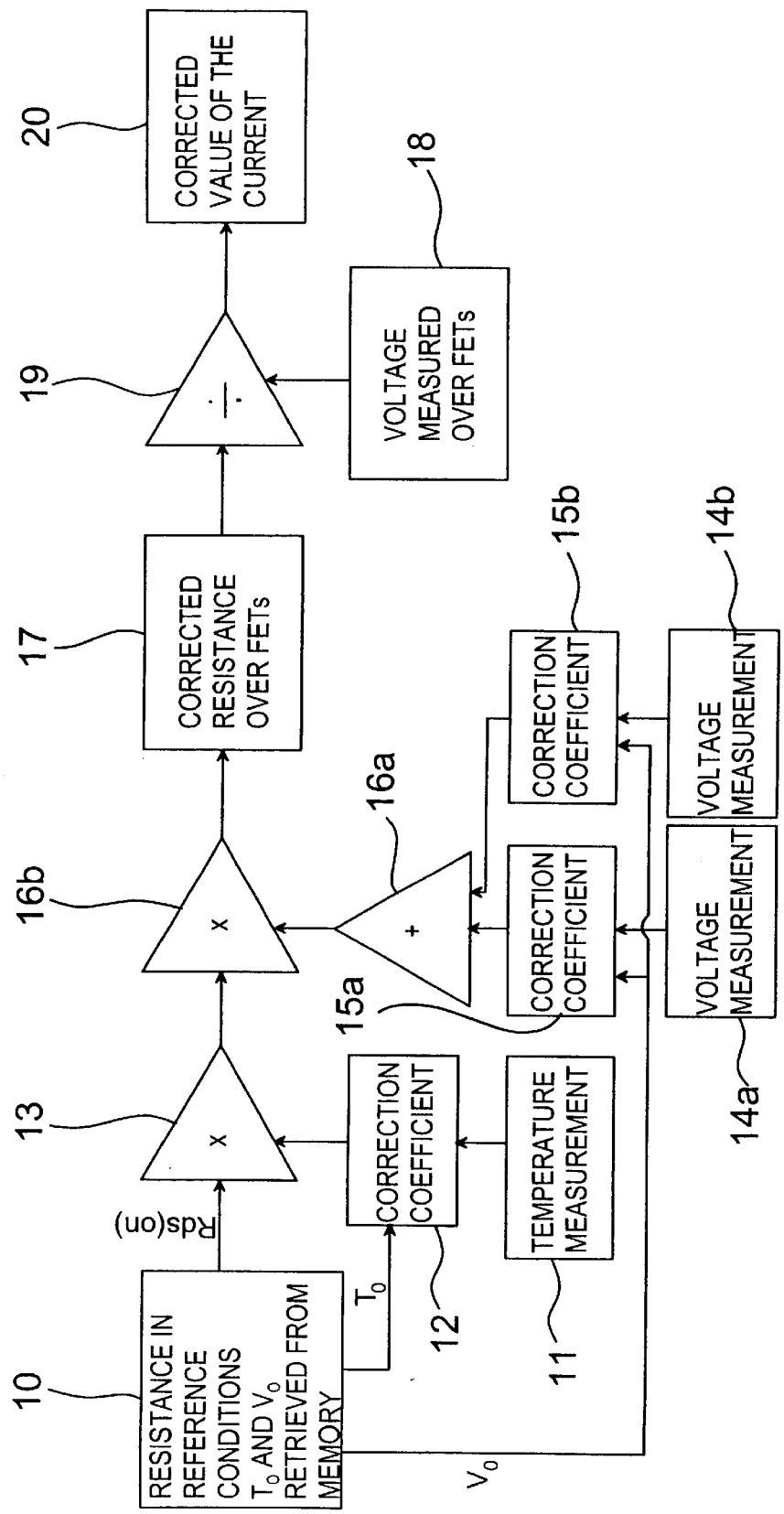
FIG. 2 is a simplified block diagram showing the operation of a protection circuit according to a preferred embodiment of the invention in the determination of a temperature and voltage compensated current.

FIG. 2 is a block diagram showing the manner in which a protection circuit according to a preferred embodiment of the invention defines a temperature and gate voltage compensated current when the properties of both field-effect transistors FET1, FET2 are substantially alike. It is possible to use the same temperature correction coefficient for both field-effect transistors, because both field-effect transistors are located in the same integrated circuit, and thus the temperatures of both field-effect transistors are substantially the same. Furthermore, it is also possible to use the same value of drain-to-source resistance $R_{ds(on)0}$ for both field-effect transistors, because their properties are substantially the same.

Naturally, it is possible that the field-effect transistors FET1, FET2 are of different types, in which case it is not possible to use the same value of drain-to-source resistance $R_{ds(on)0}$ for them both. Consequently in this case, it is necessary to make a separate behaviour model for the drain-to-source resistances $R_{ds(on)0}$ of each field-effect transistor FET1, FET2 in the parameter memory 10. Furthermore, it is possible that the temperatures of the field-effect transistors are not substantially the same, especially if the field-effect transistors are of different types. In this case, it is preferable to use separate temperature sensors 28 for both field-effect transistors FET1, FET2 and to store the temperature behaviour of both field-effect transistors separately.

To start with the value of the drain-to-source resistance $R_{ds(on)0}$ in the reference states $T_0$ and $V_0$ is retrieved from the parameter memory. Next, a temperature 11 is measured, on the basis of which it is possible to determine a particular temperature correction coefficient 12 from the temperature compensation values stored in the parameter memory 10 (FIG. 3). In this case, it is presumed that both field-effect transistors FET1, FET2 are at the same temperature, in which case it is possible to use the same temperature correction coefficient for both field-effect transistors. Next, the gate voltages 14a, 14b of both field-effect transistors are measured, on the basis of which it is possible to determine particular gate-voltage correction coefficients 15a, 15b from the gate voltage compensation values stored in the parameter memory 10. The gate voltage correction coefficients 15a, 15b can be added together because the drain-to-source resistances of the field-effect transistors FET1, FET2 are connected in series. As a result of the addition 16a, a combined gate voltage correction coefficient is obtained, A drain-to-source resistance 17 compensated with respect to both the temperature and gate voltage is obtained by multiplying the drain-to-source resistance defined in the reference conditions $T_0$ and $V_0$ (retrieved from the parameter memory 10), with the temperature correction coefficient 12 and the combined gate voltage correction coefficient 16b. In this way, an estimate of the actual value 20 of the current is obtained by dividing 19 the voltage 18 measured across the field-effect transistors by the drain-to-source resistance 17 compensated according to the temperature and gate voltages. In other words, the actual current is obtained according to the following formula:

$$I_{TOT} = \frac{U_{TOT}}{R_{ds(on)0} \cdot K_T \cdot (K_{U1} + K_{U2})}$$

$I_{TOT}$=Estimated value of the current conducted via the field-effect transistors $R_{ds(on)0}$=Drain-to-source resistance in reference conditions $K_T$=Temperature correction coefficient $K_{U1}$=Gate voltage correction coefficient for the first field-effect transistor $K_{U2}$=Gate voltage correction coefficient for the second field-effect transistor $U_{TOT}$=Voltage measured across the field-effect transistors If the field-effect transistors FET1, FET 2 are not at substantially the same temperature, but their properties are the same, it is not possible to use the same value $K_T$ for the temperature correction coefficients for both field-effect transistors, but separate values should be used for both field-effect transistors.

$$I_{TOT} = \frac{U_{TOT}}{R_{ds(on)0} \cdot (K_{T1} \cdot K_{U1} + K_{T2} \cdot K_{U2})}$$

$I_{TOT}$=Estimated value of the current conducted via the field-effect transistors $R_{ds(on)0}$=Drain-to-source resistance in reference conditions $K_{T1}$=Temperature correction coefficient for the first field-effect transistor $K_{T2}$=Temperature correction coefficient for the second field-effect transistor $K_{U1}$=Gate voltage correction coefficient for the first field-effect transistor $K_{U2}$=Gate voltage correction coefficient for the second field-effect transistor $U_{TOT}$=Voltage measured across the field-effect transistors If, on the other hand, the properties of the field-effect transistors FET1, FET2 are not substantially alike, but they are at substantially the same temperature, it is not possible to use the same value of drain-to-source resistance $R_{ds(on)0}$ for both field-effect transistors in the calculation, but separate values should be used for both field-effect transistors, $$I_{TOT} = \frac{U_{TOT}}{K_T \cdot (R_{ds(on)01} \cdot K_{U1} + R_{ds(on)02} \cdot K_{U2})}$$

$I_{TOT}$=Estimated value of the current conducted via the field-effect transistors $R_{ds(on)01}$=Drain-to-source resistance of the first field-effect transistor in reference conditions $R_{ds(on)02}$=Drain-to-source resistance of the second field-effect transistor in reference conditions $K_T$=Temperature correction coefficient $K_{U1}$=Gate voltage correction coefficient for the first field-effect transistor $K_{U2}$=Gate voltage correction coefficient for the second field-effect transistor $U_{TOT}$=Voltage measured across the field-effect transistors If the properties of the field-effect transistors FET1, FET2 are not substantially alike and they are not at substantially the same temperature, temperature and gate voltage compensation is slightly more complex than in the preceding cases. Neither the same drain-to-source resistance value $R_{ds(on)0}$ nor the same temperature correction coefficient can be used, but separate values should be used for both field-effect transistors.

$$I_{TOT} = \frac{U_{TOT}}{R_{ds(on)01} \cdot K_{T1} \cdot K_{U1} + R_{ds(on)02} \cdot K_{T2} \cdot K_{U2})}$$

$I_{TOT}$=Estimated value of the current conducted via the field-effect transistors $R_{ds(on)01}$=Drain-to-source resistance of the first field-effect transistor in reference conditions $R_{ds(on)02}$=Drain-to-source resistance of the second field-effect transistor in reference conditions $K_{T1}$=Temperature correction coefficient for the first field-effect transistor $KT2$=Temperature correction coefficient for the second field-effect transistor $K_{U1}$=Gate voltage correction coefficient for the first field-effect transistor $K_{U2}$=Gate voltage correction coefficient for the second field-effect transistor $U_{TOT}$=Voltage measured across the field-effect transistors The function of the control block 22 is to control the under-voltage prevention block 25 and the over-voltage prevention block 26 and to transmit information on the battery's charge, over-current conditions and possible over- or under-voltage states to the host device, for example a mobile phone, via the interface bus BUS. In order for the control block 22 to realise all its functions, it is provided with a memory 35. If the control block 22 detects that the battery's voltage is too low, it transmits a signal to the under-voltage prevention block 25. However, in advance of the under-voltage condition the control block 22 transmits information on the forthcoming under-voltage state to the electronic device 33, advantageously when the voltage of the battery 31 falls below a certain threshold value. This threshold value is advantageously slightly higher than the under-voltage threshold value. Because the invention enables the battery's charge to be determined more accurately, it is possible to increase the operating time of the electronic device 33, because it is not necessary to switch off the electronic device before it is absolutely essential. In practice, the electronic device is switched off earlier because the value of under-voltage harmful to the battery is typically significantly lower than the voltage at which the electronic device ceases to function. In an over-voltage condition, the control block 22 advantageously transmits information on the over-voltage to the over-voltage prevention block 26 and to the host device 33. It is not necessary to transmit information on a forthcoming over-voltage state to the host device 33 in advance, because in this case power to the electronic device is not switched off.

When the control block 22 receives too high a current value from the compensation block 29, the control block 22 transmits a signal either to the under-voltage prevention block 25 or to the over-voltage prevention block 26 depending on whether the battery is being discharged or charged, as a result of which the corresponding field-effect transistor FET1, FET2 is switched into a high impedance state.

In the charge determination block 23, it is possible to determine the charge of the battery at a given time. This can be performed in a manner known as such, for example in such a way that the charging current fed to the battery during charging is measured. More accurate determination of the current according to the invention enables the accumulated/remaining charge to be determined more accurately than in prior art solutions. There are numerous known methods for determining charge on the basis of a current, and thus it is not necessary to discuss them in further detail here. In the protection circuit according to the present invention, charge determination can be performed more accurately than in prior art solutions, because a temperature and voltage compensated drain-to-source resistance is used to determine the current. Furthermore, determination of the current is performed without components that introduce additional resistance, and thus power consumption is reduced compared with prior art solutions.

Integration of the entire protection circuit into a single application specific integrated circuit (ASIC) requires some special knowledge concerning manufacturing techniques used to produce integrated circuits. On the other hand, the protection circuit 30 is less expensive and smaller than prior art solutions, because all the components required by the protection circuit can be placed in the same application specific integrated circuit.

Battery packs 32, even those intended to be connected to the same device, e.g. a wireless terminal 33 (FIG. 5), can have different properties. For example, both Li-ion and Li-poly batteries can be used with the same device, and they both require a protection circuit to prevent damage caused by charging and discharging. However, the properties of these batteries are different. Therefore, a separate protection circuit for each different battery pack should be provided and advantageously it should be possible to select the correct settings for the battery pack being used at a particular time in the protection circuit. If the protection circuit 30 were located in the wireless communication device 33, a problem would arise as to how the protection circuit could recognize the type of the battery pack and select the correct protection values. In this case, the manufacturing costs of the wireless communication device would be increased to some extent.

Preferably, the protection circuit 30 is located in the battery pack 32 with the battery 31, in which case it is unnecessary to provide any kind of protection for the battery in the wireless communication device itself. In this case, it is possible to reduce costs, because it is possible to implement the most optimal and most advantageous protection circuit 30 for each battery 31. Furthermore, it is not necessary to provide the wireless communication device and the battery pack with equipment for recognizing the type of the battery, which would increase the costs and occupy space. Moreover, provision of a protection circuit 30 implemented in a single application specific integrated circuit 35 in the battery pack does not significantly increase the size of the battery pack. On the other hand, it is possible that the application specific integrated circuit 35 has similar properties and operates in a substantially identical fashion, irrespective of the type of the battery 31 to be protected. Advantageously parameters suitable for each battery type can be stored in the memory 10 of the application specific integrated circuit in connection with its manufacture. In other words, the same integrated circuit can be adapted to protect different batteries/battery types by storing appropriate parameters describing the behaviour of the battery in question in the parameter memory 10. Thus, the protection circuit may be provided with parameters describing the behaviour of a particular battery/battery type or parameters describing the behaviour of more than one battery/battery type may be stored in the parameter memory. In FIG. 5 the application specific integrated circuit is indicated with reference numeral 35.

When the protection circuit 30 is located in the battery pack 32, advantageously only a voltage line P3, a ground potential line GND and an interface bus BUS are provided as outputs. The wireless communication device 33 obtains its operating voltage from voltage line P3, and from ground potential line GND. The wireless communication device obtains information about the charge of the battery as well as on exceptional states via the interface bus BUS.

It is, of course possible that the protection circuit 30 is not located in the battery pack 32 with the battery 31. Thus, the protection circuit can be installed e.g. in the host device 33. In this case, the type of the battery 31 is preferably identified separately, so that the protection circuit can function properly. Thus, the battery type is identified separately, advantageously via the interface bus BUS. When the battery type has been identified, it is possible to select the correct protection parameters in the protection circuit for precisely this battery type. This situation may also arise if, for example, the host device 33 does not contain a separate battery pack 32, but the battery is located inside the host device. In this case, the protection circuit 30 is preferably also positioned inside the host device.

The present invention is not restricted solely to the embodiments presented above but can be modified within the scope of the accompanying claims. Although the examples used in the description relate to Lithium-based batteries, the invention can also be applied to other types of accumulators or batteries.

What is claimed is:

1. A protection circuit comprising:
   a switch control means for adjusting the conductivity of said switch by means of an electrical control signal applied to the control means;
   means for forming the electrical control signal;
   means for measuring at least one physical quantity affecting the conductivity of said switch;
   a parameter memory for storing dependence information about the relationship between the conductivity of said switch and said at least one measured physical quantity;
   means for calculating the conductivity of said switch on the basis of said at least one measured physical quantity and dependence information stored in said parameter memory; and
   means for determining current conducted through the switch at least partly on the basis of said calculated conductivity,
   wherein said means for forming the electrical control signal is arranged to form the electrical control signal at least partly on the basis of the determined current.

2. A protection circuit according to claim 1, wherein said at least one measured physical quantity is a temperature and said means for measuring at least one physical quantity affecting the conductivity of said switch comprises means for measuring the temperature of said switch.

3. A protection circuit according to claim 1, wherein said at least one measured physical quantity is the electrical control signal, and said means for measuring at least physical quantity affecting the conductivity of said switch comprises means for measuring the electrical control signal applied to the control means of said switch.

4. A protection circuit according to claim 1, wherein said means for measuring least one physical quantity affecting the conductivity of said switch comprises means for measuring a first physical quantity affecting the conductivity of said switch and means for measuring a second physical quantity affecting the conductivity of said switch.

5. A protection circuit according to claim 4, wherein the first physical quantity is a temperature of said switch and the second physical quantity is the electrical control signal applied to the control means of said switch.

6. A protection circuit according to claim 1, arranged to protect a battery from an exceptional state when the battery is charged or discharged.

7. A protection circuit according to claim 6, wherein the battery comprises more than one cell, and the protection circuit comprises means for measuring the voltage of each of the cells separately.

8. A protection circuit according to claim 6, wherein the battery is Lithium-based.

9. A protection circuit according to claim 6, arranged to provide information on an exceptional state to a host device the protection circuit detects the exceptional state.

10. A protection circuit according to claim 9, wherein information on an impending drop in voltage of the battery below a predetermined threshold value is to the host device before an under-voltage condition occurs in the battery.

11. The protection circuit of claim 9, further comprising means to compare a threshold value to an under-voltage threshold value to determine an impending under-voltage condition.

12. A protection circuit according to claim 6, arranged to provide information on an impending under-voltage condition host a device before the under-voltage condition occurs in the battery.

13. A protection circuit according to claim 6, further comprising means for supplying power from the battery to an electrically-powered device and means for supplying power from a charging device to the battery the protection circuit comprising two field-effect transistors whose drains are coupled in series in such a way that the first field-effect transistor is arranged to control charging of the battery and the second field-effect transistor is arranged to control the supply of power from the battery to the electrically-powered device.

14. A protection circuit according to claim 13, comprising:
- a temperature sensor for measuring the temperature of the first and second field-effect transistors;
- means for measuring a gate voltage of first field-effect transistor;
- means for measuring a gate voltage of the second field-effect transistor; and
- means for measuring a voltage $U_{TOT}$ between the source of the first field-effect transistor and the source of the second field-effect transistor.

15. A protection circuit according to claim 14, arranged to estimate the current conducted via the first and second field-effect transistors according to the following formula:

$$I_{TOT} = \frac{U_{TOT}}{R_{ds(on)0} \cdot K_T \cdot (K_{U1} + K_{U2})}$$

where:

$I_{TOT}$ is the current conducted via the first and second field-effect transistors;

$R_{ds(on)0}$ represents the drain-to-source resistance of each of the first and second field-effect transistors at predetermined temperature gate voltage;

$K_T$ is a temperature dependent correction coefficient, obtained on the basis of value provided by the temperature sensor and using dependence information stored in the parameter memory relating to the change in drain-to-source resistance $R_{ds(on)}$ of the first and the second field-effect transistors when the temperature changes at constant gate voltage;

$K_{U1}$ is a gate voltage dependent correction coefficient for the first field-effect transistor obtained on the basis of a measurement of gate voltage provided by said means for measuring the gate voltage of the first field-effect transistor and using dependence information stored in the parameter memory relating to the change in drain-to-source resistance $R_{ds(on)}$ of the first field-effect transistor when the gate voltage of the first field-effect transistor changes at constant temperature;

$K_{U2}$ is a gate voltage dependent correction coefficient for the second field-effect transistor obtained on the basis of measurement of gate voltage provided by said means for measuring the gate voltage of the second field-effect transistor and using dependence information stored in the parameter memory relating to the change in drain-to-source resistance $R_{ds(on)}$ of the second field-effect transistor when the gate voltage of the second field-effect transistor changes at constant temperature; and $U_{TOT}$ is the voltage between the sources of the first and second field-effect transistors.

16. A protection circuit according to claim 14, arranged to estimate the current conducted via the first and second field-effect transistors according to the following formula:

$$I_{TOT} = \frac{U_{TOT}}{R_{ds(on)0} \cdot (K_{T1} \cdot K_{U1} + K_{T2} \cdot K_{U2})}$$

where:

$I_{TOT}$ is the current conducted via the first and second field-effect transistors;

$R_{ds(on)0}$ represents the drain-to-source resistance of each of the first and second field-effect transistors at predetermined temperature and gate voltage;

$K_{T1}$ is a temperature dependent correction coefficient for the first field-effect transistor obtained on the basis of value provided by the temperature sensor and using dependence information stored in the parameter memory relating to the change in drain-to-source resistance $R_{ds(on)}$ of the first field-effect transistor when the temperature of the first field-effect transistor changes at constant gate voltage;

$K_{T2}$ is a temperature dependent correction coefficient for the second field-effect transistor obtained on the basis of value provided by the temperature sensor and using dependence information stored in the parameter memory relating to the change in drain-to-source resistance $R_{ds(on)}$ of the second field-effect transistor when the temperature of the second field-effect transistor changes at constant gate voltage;

$K_{U1}$ is a gate voltage dependent correction coefficient for the first field-effect transistor obtained on the basis of measurement of gate voltage provided by said means for measuring the gate voltage of the first field-effect transistor and using dependence information stored in the parameter memory relating to the change in drain-to-source resistance $R_{ds(on)}$ when the gate voltage of the first field-effect transistor changes at constant temperature;

$K_{U2}$ is a gate voltage dependent correction coefficient for the second field-effect transistor obtained on the basis of a measurement of gate voltage provided by said means for measuring the gate voltage of the second field-effect transistor and using dependence information stored in the parameter memory relating to the change in drain-to-source resistance $R_{ds(On)}$ of the second field-effect transistor when the gate voltage of the second field-effect transistor changes at constant temperature; and $U_{TOT}$ is the voltage between the sources of the first and second field-effect transistors.

17. A protection circuit according to claim 14, arranged to estimate the current conducted via the first and second field-effect transistors according to the following formula:

$$I_{TOT} = \frac{U_{TOT}}{K_T \cdot (R_{ds(on)01} \cdot K_{U1} + R_{ds(on)02} \cdot K_{U2})}$$

where:

$I_{TOT}$ is the current conducted via the first and second field-effect transistors;

$R_{ds(on)01}$ is the drain-to-source resistance of the first field-effect transistor at a predetermined temperature and gate voltage;

$R_{ds(on)02}$ is the drain-to-source resistance of the second field-effect transistor at a predetermined temperature gate voltage;

$K_T$ is a temperature dependent correction coefficient obtained on the basis of a value provided by the temperature sensor and using dependence information stored in the parameter memory relating to the change in drain-to-source resistances $R_{ds(on)1}$ and $R_{ds(on)2}$ of the first and respectively the second field-effect transistor when the temperature changes at constant gate voltage;

$K_{U1}$ is a gate voltage dependent correction coefficient for the first field-effect transistor obtained on the basis of measurement of gate voltage provided by said means for measuring the gate voltage of the first field-effect transistor and using dependence information stored in the parameter memory relating to the change in drain-to-source resistance $R_{ds(on)01}$ of the first field-effect transistor when the gate voltage of the first field-effect transistor changes at constant temperature;

$K_{U2}$ is a gate voltage dependent correction coefficient for the second field-effect transistor obtained on the basis of measurement of gate voltage provided by said means for measuring the gate voltage of the second field-effect transistor and using dependence information stored in the parameter memory relating to the change in drain-to-source resistance $R_{ds(on)02}$ of the second field-effect transistor when the gate voltage of the second field-effect transistor changes at constant temperature; and $U_{TOT}$ is the Voltage between the sources of the first and second field-effect transistors.

18. A protection circuit according to claim 14, arranged to estimate the current conducted via the first and second field-effect transistors according to the following formula:

$$I_{TOT} = \frac{U_{TOT}}{R_{ds(on)01} \cdot K_{T1} \cdot K_{U1} + R_{ds(on)02} \cdot K_{T2} \cdot K_{U2}}$$

where:

$I_{TOT}$ is the current conducted via the first and second field-effect transistors;

$R_{ds(on)01}$ is the drain-to-source resistance of the first field-effect transistor predetermined temperature and gate voltage;

$R_{ds(on)02}$ is the drain-to-source resistance of the second field-effect transistor at predetermined temperature and gate voltage;

$K_{T1}$ is a temperature dependent correction coefficient for the first field-effect transistor obtained on the basis of a value provided by the temperature sensor and using dependence information stored in the parameter memory relating to the change in drain-to-source resistance $R_{ds(on)01}$ of the first field-effect transistor when the temperature of the first field-effect transistor changes at a constant gate voltage;

$K_{T2}$ is a temperature dependent correction coefficient for the second field-effect transistor obtained on the basis of a value provided by the temperature sensor and using dependence information stored in the parameter memory relating to the change in drain-to-source resistance $R_{ds(on)02}$ of the second field-effect transistor when the temperature of the second field-effect transistor changes at a constant gate voltage;

$K_{U1}$ is a gate voltage dependent correction coefficient for the first field-effect transistor obtained on the basis of measurement of gate voltage provided by said means for measuring the gate voltage of the first field-effect transistor and using dependence information stored in the parameter memory relating to the change in drain-to-source resistance $R_{ds(on)01}$ of the first field-effect transistor when the gate voltage of the first field-effect transistor changes at constant temperature;

$K_{U2}$ is a gate voltage dependent correction coefficient for the second field-effect transistor obtained on the basis of measurement of gate voltage provided by said means for measuring the gate voltage of the second field-effect transistor and using dependence information stored in the parameter memory relating to the change in drain-to-source resistance $R_{ds(on)02}$ of the second field-effect transistor when the gate voltage of the second field-effect transistor changes at a constant temperature; and $U_{TOT}$ is the voltage between the sources of the first and second field-effect transistors.

19. A protection circuit according to claim 14, wherein the temperature sensor comprises a first temperature sensor for measuring the temperature of the first field-effect transistor and a second temperature sensor for measuring the temperature of the second field-effect transistor.

20. A protection circuit according to claim 6, wherein the exceptional state is at least one of the following: an under-voltage condition, an over-voltage condition, an over-current condition.

21. A protection circuit according to claim 6, comprising means for measuring the voltage of the battery.

22. A protection circuit according to claim 1, comprising means for determining the charge condition of a battery.

23. A protection circuit according to claim 1, wherein the switch is a field-effect transistor, the control means is the gate of the field-effect transistor and the electrical control signal is a gate voltage used to control the drain-to-source resistance between the drain and the source of the field-effect transistor.

24. A protection circuit according to claim 23, wherein the parameter memory is arranged to store dependence information including information about the drain-to-source resistance of the field-effect transistor at a predetermined first temperature $T_0$ and a predetermined first gate voltage $V_0$, as well as information on a change in the drain-to-source resistance when the gate voltage changes at the first temperature $T_0$, and information on a change in the drain-to-source resistance when the temperature changes at the first gate voltage $V_0$.

25. A protection circuit according to claim 23, wherein the parameter memory is arranged to store dependence information including information about the value of the drain-to-source resistance of the field-effect transistor for different combinations of temperature and gate voltage.

26. An integrated circuit including a protection circuit comprising a switch having a control means for adjusting the conductivity of said switch by means of an electrical control signal applied to the control means the protection circuit comprising:

means for forming the electrical control signal;

means for measuring at least one physical quantity affecting the conductivity of said switch;

a parameter memory for storing dependence information about the relationship between the conductivity of said switch and said at least one measured physical quantity;

means for calculating the conductivity of said switch on the basis of said at least one measured physical quantity and dependence information stored in said parameter memory; and means for determining a current conducted through the switch at least partly on the basis of said calculated conductivity, wherein said means for forming the electrical control signal is arranged to form the electrical control signal at least partly on the basis of the determined current.

27. An electrically-powered device including a protection circuit comprising a switch having a control means for adjusting the conductivity of said by means of an electrical control signal applied to the control means the protection circuit comprising:

means for forming the electrical control signal;

means for measuring at least one physical quantity affecting the conductivity of said switch;

parameter memory for storing dependence information about the relationship between the conductivity of said switch and said at least one measured physical quantity;

means for calculating the conductivity of said switch on the basis of said at least one measured physical quantity and dependence information stored said parameter memory; and means for determining a current conducted through the switch at least partly on the basis of said calculated conductivity, wherein said means for forming the electrical control signal is arranged to form the electrical control signal at least partly on the basis of the determined current.

28. An electrically-powered device according to claim 27, that is a wireless communication device.

29. An electrically-powered device according to claim 27, wherein the protection circuit is arranged to protect a battery used as a power source for the electronically-powered device.

30. An electrically-powered device according to claim 29, wherein the battery is arranged to be detachable connected to the device.

31. An electrically-powered device according to claim 29, wherein the battery is integrated in the device.

32. Electrically-powered device according to claim 29, wherein the protection circuit comprises means for determining the charge condition of the battery.

33. An electrically-powered device according to claim 32, arranged to be switched off responsive to information on the charge condition of the battery provided by the protection circuit.

34. A battery unit including a protection circuit comprising a switch having a control means adjusting the conductivity of said switch by means of an electrical control signal applied to the control means, the protection circuit comprising:

means for forming the electrical control signal;

means for measuring at least one physical quantity affecting the conductivity of said switch;

parameter memory for storing dependence information about the relationship between the conductivity of said switch and said at least one measured physical quantity;

means calculating the conductivity of said on the basis of said at least one measured physical quantity and dependence information stored in said parameter memory; and means for determining a current conducted through the switch at least partly on the basis of said calculated conductivity, wherein said means for forming the electrical control signal is arranged to for the electrical control signal at least partly on the basis of the determined current.

35. A battery unit according to claim 34, arranged to be detachably connected to an electrically-powered device.

36. A method for operating a protection circuit, the protection circuit comprising a switch having a control means for adjusting the conductivity of the switch by means of an electrical control signal to the control means, the method comprising:

measuring at least one physical quantity affecting the conductivity of said switch storing dependence information about the relationship between the conductivity of said switch and said at least one measured physical quantity in a parameter memory;

calculating the conductivity of said switch on the basis of said at least one measured physical quantity and the dependence information stored in said parameter memory;

determining a current conducted through said switch at least partly on the basis of the calculated conductivity; and forming said electrical control signal at least partly on the basis of the determined current.

37. A method according to claim 36, wherein said at least one measured physical quantity is a temperature of the switch.

38. A method according to claim 36, wherein said at least one measured physical quantity is the electrical control signal applied to the control means of the switch.

39. A method according to claim 36, comprising:

measuring a first physical quantity affecting the conductivity of the switch;

measuring a second physical quantity affecting the conductivity of the switch;

storing dependence information about the relationship between the conductivity of said switch and the first and second measured physical quantities in the parameter memory;

calculating the conductivity of said switch on the basis of said first and second measured physical quantities and the dependence information stored in said parameter memory.

40. A method according to claim 39, used in a protection circuit in which the switch is a field-effect transistor, the control means is the gate of the field-effect transistor, and the electrical control signal is a gate voltage used to control the drain-to-source resistance between the drain and the source of the field-effect transistor.

41. A method according to claim 40, comprising storing dependence information including information about the drain-to-source resistance of the field-effect transistor at a predetermined first temperature $T_0$ and at a first gate voltage $V_0$ in the parameter memory, as well as information on a change in the drain-to-source resistance when the gate voltage changes at the first temperature $T_0$ and information on a change in the drain-to-source resistance when the temperature changes at the first gate voltage $V_0$.

42. A method according to claim 40, comprising storing dependence information including information about the value of the drain-to-source resistance of the field-effect transistor for different combinations of temperature and gate voltage in said parameter memory.

43. A method according to claim 36, used to protect a battery from an exceptional state when the battery is charged or discharged.

44. A method according to claim 43, wherein the battery is a Lithium-based battery.

45. A method according to claim 43, comprising providing a host device with information on said exceptional condition.

46. A method according to claim 45, comprising providing information on an impending under-voltage condition to the host device before the under-voltage condition occurs in the battery.

47. A method according to claim 43, comprising determining the charge condition of the battery.

48. A method according to claim 43, wherein the exceptional state is at least one of the following: an under-voltage condition, an over-voltage condition, an over-current condition.

49. A method according to claim 43, used in a protection circuit comprising two field-effect transistors connected in series from their drains in such a way that the first field-effect transistor controls charging of the battery, and the second field-effect transistor controls the power supplied from the battery to an electrically-powered device.

50. A method according to claim 49, comprising:

measuring the temperature of the first and second field-effect transistors by means of a temperature sensor;

measuring the gate voltage of the first field-effect transistor;

measuring the gate voltage of the second field-effect transistor; and measuring the voltage $U_{TOT}$ between the source of the first field-effect transistor and the source of the second field-effect transistor.

51. A method according to claim 50, comprising estimating the current conducted via the first and second field-effect transistors according to the following formula:

$$I_{TOT} = \frac{U_{TOT}}{R_{ds(on)0} \cdot K_T \cdot (K_{U1} + K_{U2})}$$

where: $I_{TOT}$ is the current conducted via the first and second field-effect transistors;

$R_{ds(on)0}$ represents the drain-to-source resistance of each of the first and second field-effect transistors at a predetermined temperature gate voltage;

$K_T$ is a temperature dependent correction coefficient obtained on the basis of a value given by the temperature sensor and using dependence information stored in the parameter memory relating to the change in drain-to-source resistance $R_{ds(on)}$ of the first and second field-effect transistors when the temperature changes at constant gate voltage;

$K_{U1}$ is a gate voltage dependent correction coefficient for the first field-effect transistor obtained on the basis of measurement of gate voltage provided by said means for measuring the gate voltage of the first field-effect transistor and using dependence information stored in the parameter memory relating to the change in drain-to-source resistance $R_{ds(on)}$ of the first field-effect transistor when the gate voltage of the first field-effect transistor changes at constant temperature;

$K_{U2}$ is a gate voltage dependent correction coefficient for the second field-effect transistor obtained on the basis of measurement of gate voltage provided by said means for measuring the gate voltage of the second field-effect transistor and using dependence information stored in the parameter memory relating to the change in drain-to-source resistance $R_{ds(on)}$ of the second field-effect transistor when the temperature of the second field-effect transistor changes at constant temperature; and $U_{TOT}$ is the voltage between the sources of the first and second field-effect transistors.

52. A method according to claim 50, comprising estimating the current conducted via the first and the second field-effect transistors according to the following formula:

$$I_{TOT} = \frac{U_{TOT}}{R_{ds(on)0} \cdot (K_{T1} \cdot K_{U1} + K_{T2} \cdot K_{U2})}$$

where:

$I_{TOT}$ is the current conducted via the first and second field-effect transistor;

$R_{ds(on)0}$ represents the drain-to-source resistance of each of the first and second field-effect transistors at a predetermined temperature and gate voltage;

$K_{T1}$ is a temperature dependent correction coefficient for the first field-effect transistor obtained on the basis of a value provided by the temperature sensor and using dependence information stored in the parameter memory relating to the change in drain-to-source resistance $R_{ds(on)}$ of the first field-effect transistor when the temperature of the first field-effect transistor changes at constant gate voltage;

$K_{T2}$ is a temperature dependent correction coefficient for the second field-effect transistor obtained on the basis of a value provided by the temperature sensor and using dependence information stored in the parameter memory relating to the change in drain-to-source resistance $R_{ds(on)}$ of the second field-effect transistor when the temperature of the second field-effect transistor changes at constant gate voltage;

$K_{U1}$ is a gate voltage dependent correction coefficient for the first field-effect transistor obtained on the basis of measurement of gate voltage provided by said means for measuring the gate voltage of the first field effect transistor and using dependence information stored in the parameter memory relating to the change in the drain-to-source resistance $R_{ds(on)}$ of the first field-effect transistor when the gate voltage of the first field-effect transistor changes at constant temperature;

$K_{U2}$ is a gate voltage dependent correction coefficient for the second field-effect transistor obtained on the basis of a measurement of gate voltage provided by said means for measuring the gate voltage of the second field-effect transistor and using dependence information stored in the parameter memory relating to the change in drain-to-source resistance $R_{ds(on)}$ of the second field-effect transistor when the gate voltage of the second field-effect transistor changes at a-constant temperature; and $U_{TOT}$ is the voltage between the sources of the first and second field-effect transistors.

53. A method according to claim 50, comprising estimating the current conducted via the first and second field-effect transistors according to the following formula:

$$I_{TOT} = \frac{U_{TOT}}{K_T \cdot (R_{ds(on)01} \cdot K_{U1} + R_{ds(on)02} \cdot K_{U2})}$$

where:

$I_{TOT}$ is the current conducted via the first and second field-effect transistors;

$R_{ds(on)01}$ is the drain-to-source resistance of the first field-effect transistor at a predetermined temperature gate voltage;

$R_{ds(on)02}$ is the rain-to-source resistance of the second field-effect transistor at a predetermined temperature and gate voltage;

$K_T$ is a temperature dependent correction coefficient obtained on the basis of a value provided by the temperature sensor and using dependence information stored in the parameter memory relating to the change in drain-to-source resistances $R_{ds(on)01}$ and $R_{ds(on)2}$ of the first and respectively the second field-effect transistor when the temperature changes at constant gate voltage;

$K_{U1}$ is a gate voltage dependent correction coefficient for the first field-effect transistor obtained on the basis of measurement gate voltage provided by said means for measuring the gate voltage of the first field-effect transistor and using dependence information stored in the parameter memory relating to the change in drain-to-source resistance $R_{ds(on)01}$ of the field-effect transistor when the gate voltage of the first field-effect transistor changes at constant temperature;

$K_{U2}$ is a gate voltage dependent correction coefficient for the second field-effect transistor obtained on the basis of measurement of gate voltage provided by said means for measuring the gate voltage of the second field-effect transistor and using dependence information stored in the parameter memory relating to the change in drain-to-source resistance $R_{ds(on)02}$ of the second field-effect transistor when the gate voltage of the second field-effect transistor changes at constant temperature; and $U_{TOT}$ is the voltage between the sources of the first and second field-effect transistors.

54. A method according to claim 50, comprising estimating the current conducted via the first and second field-effect transistors according to the following formula:

$$I_{TOT} = \frac{U_{TOT}}{R_{ds(on)01} \cdot K_{T1} \cdot K_{U1} + R_{ds(on)02} \cdot K_{T2} \cdot K_{U2}}$$

where:

$I_{TOT}$ is the current conducted via the first and second field-effect transistors $R_{ds(on)01}$ is the drain-to-source resistance of the first field-effect transistor at a predetermined temperature and gate voltage;

$R_{ds(on)02}$ is the drain-to-source resistance of the second field-effect transistor at a predetermined temperature and gate voltage;

$K_{T1}$ is a temperature correction coefficient for the first field-effect transistor obtained on the basis of a value provided by the temperature sensor and using dependence information stored in the parameter memory relating to the change in drain-to-source resistance $R_{ds(on)01}$ of the first field-effect transistor when the temperature of the first field-effect transistor changes at constant gate voltage;

$K_{T2}$ is a temperature dependent correction coefficient for the second field-effect transistor obtained on the basis of a value provided by the temperature sensor and using dependence information stored in the parameter memory relating to the change in drain-to-source resistance $R_{ds(on)02}$ of the second field-effect transistor when the temperature of the second field-effect transistor changes at constant gate voltage;

$K_{U1}$ is a gate voltage dependent correction coefficient for the first field-effect transistor obtained on the basis of measurement of gate voltage provided by said means for measuring the gate voltage of the first field-effect transistor and using dependence information stored in the parameter memory relating to the change in drain-to-source resistance $R_{ds(on)01}$ of the first field-effect transistor when the gate voltage of the first field-effect transistor changes at a-constant temperature;

$K_{U2}$ is a gate voltage dependent correction coefficient for the second field-effect transistor obtained on the basis of measurement of gate voltage provided by said means for measuring the gate voltage of the second field-effect transistor and using dependence information stored in the parameter memory relating to the change in drain-to-source resistance $R_{ds(on)02}$ of the second field-effect transistor when the gate voltage of the second field-effect transistor changes at constant temperature; and $U_{TOT}$ is the voltage between the sources of the first and second field-effect transistors.

55. A method according to claim 50, wherein the temperature sensor comprises a first temperature sensor for measuring the temperature of the first field-effect transistor and a second temperature sensor for measuring the temperature of the second field-effect transistor.

* * * * *

UNITED STATES PATENT AND TRADEMARK OFFICE
CERTIFICATE OF CORRECTION

PATENT NO. : 6,804,100 B2
DATED : October 12, 2004
INVENTOR(S) : Astala

It is certified that error appears in the above-identified patent and that said Letters Patent is hereby corrected as shown below:

Column 16,
Line 19, after "at least" insert -- one --.
Line 25, after "measuring" insert -- at --.
Line 48, after "is" insert -- transmitted --.
Line 56, delete "host a" and insert -- to a host --, therefor.
Line 61, after "battery" insert -- , --.

Column 17,
Line 5, after "of" insert -- the --.
Lines 24 and 66, after "at" insert -- a --.
Line 25, after "temperature" insert -- and --.
Line 45, after "of" insert -- a --.

Column 18,
Line 3, insert -- a -- before "value".
Lines 11, 18 and 65, after "of" insert -- a --.
Line 54, after "temperature" insert -- and --.

Column 19,
Line 28, after "transistor" insert -- at a --.
Lines 41 and 49, after "at" delete "a".
Lines 52 and 61, insert -- a -- before "measurement".

Column 20,
Line 59, after "said" insert -- switch --.
Line 60, after "means" insert -- , --.
Line 65, insert -- a -- before "parameter".

Column 21,
Line 18, delete "detachable" and insert -- detachably --, therefor.
Lines 30 and 41, after "means" insert -- for --.
Line 37, insert -- a -- before "parameter".
Line 41, after "said" insert -- switch --.
Line 48, delete "for" and insert -- form --, therefor.
Line 56, after "signal" insert -- applied --.

Column 23,
Line 25, after "temperature" insert -- and --.
Lines 36 and 45, insert -- a -- before "measurement".
Line 64, delete "transistor" and insert -- transistors --, therefor.

UNITED STATES PATENT AND TRADEMARK OFFICE
CERTIFICATE OF CORRECTION

PATENT NO. : 6,804,100 B2
DATED : October 12, 2004
INVENTOR(S) : Astala

It is certified that error appears in the above-identified patent and that said Letters Patent is hereby corrected as shown below:

Column 24,
Lines 20 and 66, insert -- a -- before "measurement".
Line 35, delete "a-constant" and insert -- constant --, therefor.
Line 53, delete "rain-to-source" and insert -- drain-to-source --, therefor.
Line 66, after "measurement" insert -- of --.

Column 25,
Line 8, insert -- a -- before "measurement".
Line 27, after "transistors" insert -- ; --.

Column 26,
Lines 14 and 24, insert -- a -- before "measurement".
Line 20, delete "a-constant" and insert -- constant --, therefor.

Signed and Sealed this

Fifth Day of April, 2005

JON W. DUDAS
*Director of the United States Patent and Trademark Office*